March 7, 1967 G. A. PON 3,308,031
METHOD AND APPARATUS FOR INCREASING BURNOUT
HEAT FLUX IN REACTOR PRESSURE TUBES
Filed June 17, 1965

INVENTOR
GEORGE A. PON
By
PATENT AGENT

United States Patent Office 3,308,031
Patented Mar. 7, 1967

3,308,031
METHOD AND APPARATUS FOR INCREASING BURNOUT HEAT FLUX IN REACTOR PRESSURE TUBES
George A. Pon, Deep River, Ontario, Canada, assignor to Atomic Energy of Canada Limited, Ottawa, Ontario, Canada, a corporation of Canada
Filed June 17, 1965, Ser. No. 464,690
Claims priority, application Canada, Aug. 21, 1964, 910,012
11 Claims. (Cl. 176—43)

This invention relates to a method and apparatus for increasing the burnout heat flux in boiling water pressure tube reactors.

Boiling water reactors wherein the heat produced by the fissioning of the nuclear fuel in the core is used to boil the coolant passing through the pressure tubes containing the fuel bundles are coming into more widespread use. In these reactors the coolant (heavy water or light water, is introduced in the liquid phase and is allowed to boil to form a steam/water mixture. The steam from this mixture is used to drive a conventional turbo-generator for the production of electrical energy. The "burnout heat flux" is usually a limit in the thermal design of a boiling water reactor and it is desirable that it be as high as possible consistent with other thermodynamic parameters most especially in the case of a boiling light water-cooled reactor.

Burnout heat flux may be defined as the level of heat flow reached in a reactor when there is a condition of rapid deterioration of the cooling process with forced flow of high quality steam/water mixtures. This burnout is a form of "crisis" and is sometimes referred to as "critical heat flux." It can be readily seen that this critical condition should not be allowed to take place but as efficient operation of a reactor dictates that large amounts of heat be taken from the nuclear fuel by the coolant it should be closely approached. Therefore, any construction of a boiling reactor that will raise the burnout or critical heat flux and allow the reactor to be operated at higher heat fluxes is most desirable.

It is an object of the present invention to provide a type of construction of the nuclear fuel bundle and its associated fuel channel such that the burnout heat flux is raised considerably.

This and other objects of the invention are achieved by wrapping the fuel bundles with a series of rings that will spring out against the pressure tube wall to block the flow of water along the surface of the pressure tube and direct it towards the fuel elements in the fuel bundles.

Figure 1:
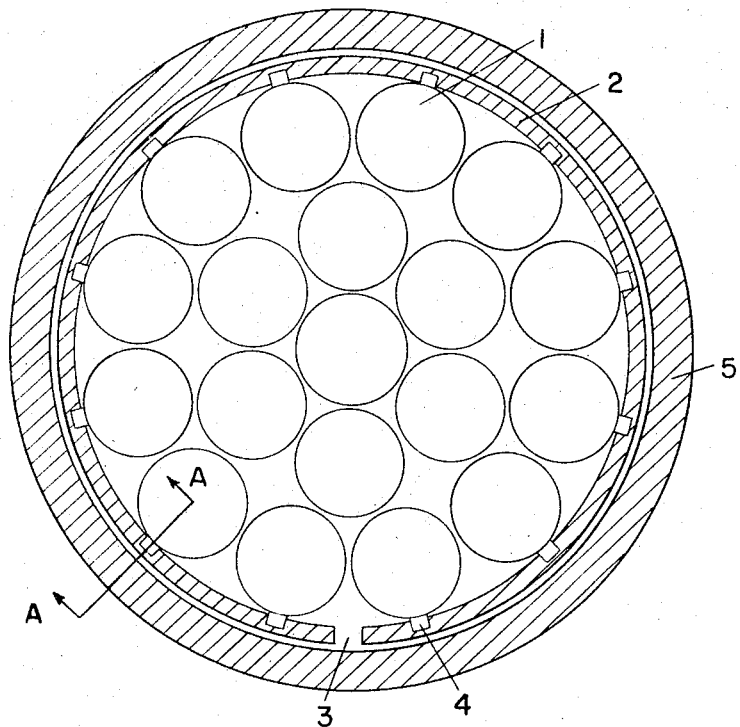
Figures 2, 3:
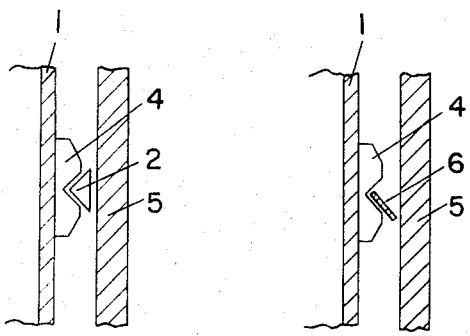

In drawings which illustrate embodiments of the invention,

FIGURE 1 is a cross-section of a nuclear reactor fuel channel and a fuel bundle positioned therein with a ring installed, FIGURE 2 is a cross-section taken on the line A—A of FIGURE 1, and FIGURE 3 is a cross-section showing an alternative form of the ring.

Referring to FIGURE 1, a fuel bundle made up of a group of cylindrical fuel elements 1 is positioned inside a reactor pressure tube 5. Normally, the fuel bundle which is held together by webs, end spiders, or other spacer means (not shown) are loaded in the pressure tubes and are pushed through the core of the reactor as dictated by the operational requirements. At any one time, a series of fuel bundles in end-to-end relationship are in position in the tubes and the coolant is pumped down the tubes through the spaces left by the fuel elements. This coolant is required to remove the heat generated by the fuel due to nuclear activity. In the case of boiling water reactors, the coolant will be a two phase, steam/water mixture. A split ring 2 having a gap 3 somewhat similar to an automobile piston ring is positioned around the fuel bundle and is loosely held in position by a series of wear pads 4 fixed to the surface of the outer fuel elements 1. After the fuel bundle has been inserted and positioned in the pressure tube, the ring 2 which was previously contracted, springs outwardly and engages the surface of the pressure tube 5. It is then in the operating position.

FIGURE 2 shows the ring 2 in the wear pad 4 fixed to fuel bundle 1 before the ring is allowed to spring out against the surface of pressure tube 5.

Referring to FIGURE 3, an alternative form of ring 6 is shown. In this case the ring is substantially flat or ribbon-like in cross-section.

It has been found that there is significant water film on the surface of the pressure tube wall. To be of the most benefit, this water should be on the heated surfaces of the fuel elements. As the steam/water mixture passes down the fuel channel, water tends to accumulate on the pressure tube wall. The rings act to block the flow of water along the pressure tube surface and to direct it towards the fuel elements. The burnout heat flux is increased because the fuel element surfaces are being continuously wetted by the water deflected away from the pressure tube wall by the rings.

The rings would preferably be made of zirconium alloy, but other metals, such as stainless steel, might be used. The cross-section of the ring shown in the drawings is triangular or ribbon-like but other cross-sections e.g. rectangular might be used as well.

A number of the rings would be placed on the fuel bundles along their length but the number or spacing is not critical. A spacing between individual rings of the order of the diameter of the fuel elements has been considered to be optimum. It should be realized that the insertion of these rings increases the amount of material in the core of the reactor acting as a neutron absorber and, as this is wasteful and undesirable, a compromise in the number of rings used would have to be reached.

The wear pads serve to position the rings along the longitudinal length of the fuel bundles and also to prevent wear or damage to the outer fuel elements in the fuel bundles by the rings themselves both during insertion and in operation.

What is claimed is:

1. Apparatus for increasing the burnout heat flux in a boiling water reactor of the type having fuel bundles made up of a group of fuel elements positioned in pressure tubes passing through the core of the reactor comprising a series of metal rings encircling the said fuel bundles and engaging the inner surface of the said pressure tubes such that water from the steam/water coolant will not accumulate on the pressure tube surfaces but will be directed inwardly toward the fuel elements of the said fuel bundles.

2. Apparatus for increasing the burnout heat flux in a boiling water reactor as in claim 1 wherein the said rings are split such that the rings may be contracted when the fuel bundle is being inserted in the pressure tube and will expand after insertion to contact the pressure tube inner surface.

3. Apparatus for increasing the burnout heat flux in a boiling water reactor as in claim 1 wherein the rings are triangular in cross-section.

4. Apparatus for increasing the burnout heat flux in a boiling water reactor as in claim 1 wherein the rings are rectangular in cross-section.

5. Apparatus for increasing the burnout heat flux in a boiling water reactor as in claim 1 wherein the rings are ribbon-like in cross-section.

6. Apparatus for increasing the burnout heat flux in a boiling water reactor of the type having fuel bundles made up of fuel elements positioned in horizontal pressure tubes passing through the core of the reactor comprising a series of zirconium alloy rings encircling the said fuel bundles, said rings being positioned in a series of wear pads attached to the outer surfaces of the outer fuel elements in the fuel bundles and being split such that the rings will contact the inner surface of the pressure tubes after the fuel bundles have been positioned in the tubes.

7. A method of increasing the burnout heat flux in a boiling water reactor of the type having fuel bundles made up of groups of fuel elements positioned in pressure tubes passing through the core of the reactor comprising encircling the fuel bundles with a series of split rings, contracting the rings during insertion of the fuel bundles into the pressure tubes, and allowing the rings after insertion to expand to contact the inner surfaces of the pressure tubes such that on passage of steam/water coolant mixtures down the tubes, any accumulated water on the pressure tube surfaces will be deflected inwardly toward the fuel elements in the said fuel bundles.

8. A method of increasing the burnout heat flux in a boiling water reactor as in claim 7 wherein the series of rings are spaced apart along the length of the fuel bundles a distance substantially equal to the diameter of the fuel element in the fuel bundles.

9. Apparatus for increasing the burnout heat flux in a boiling water reactor as in claim 2 wherein the rings are triangular in cross-section.

10. Apparatus for increasing the burnout heat flux in a boiling water reactor as in claim 2 wherein the rings are rectangular in cross-section.

11. Apparatus for increasing the burnout heat flux in a boiling water reactor as in claim 2 wherein the rings are ribbon-like in cross-section.

References Cited by the Examiner

UNITED STATES PATENTS

| 3,189,524 | 1/1965 | Hocker et al. | 176—64 X |
| 3,228,853 | 1/1966 | Ritz | 176—64 X |

FOREIGN PATENTS 883,030  11/1961  Great Britain.

REUBEN EPSTEIN, *Primary Examiner.*